Aug. 18, 1925.  1,550,335
F. G. BENEDICT ET AL
APPARATUS FOR MEASURING OXYGEN CONSUMPTION IN THE STUDY OF METABOLISM
Filed April 17, 1924
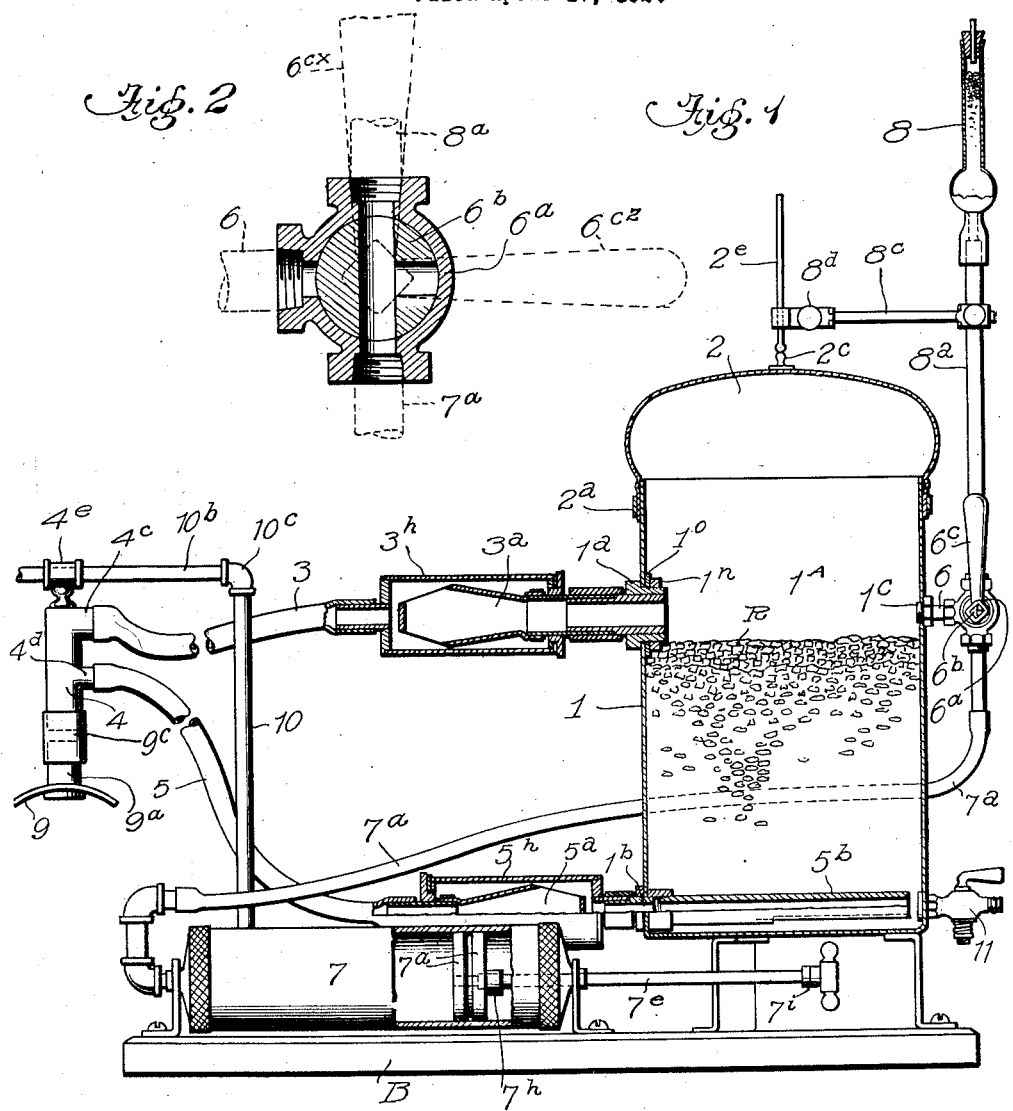

Patented Aug. 18, 1925.

1,550,335

UNITED STATES PATENT OFFICE.

FRANCIS G. BENEDICT AND CORNELIA GOLAY BENEDICT, OF BOSTON, MASSACHUSETTS, ASSIGNORS TO CARNEGIE INSTITUTION OF WASHINGTON, OF WASHINGTON, DISTRICT OF COLUMBIA, A CORPORATION INCORPORATED BY ACT OF CONGRESS OF THE UNITED STATES.

APPARATUS FOR MEASURING OXYGEN CONSUMPTION IN THE STUDY OF METALBOLISM.

Application filed April 17, 1924. Serial No. 707,156.

*To all whom it may concern:*

Be it known that we, FRANCIS G. BENEDICT and CORNELIA GOLAY BENEDICT, citizens of the United States, residing at Boston, in the county of Suffolk and State of Massachusetts, have invented certain new and useful Improvements in Apparatus for Measuring Oxygen Consumption in the Study of Metabolism; and we hereby declare that the following is a full, clear, and exact description thereof, reference being had to the accompanying drawings, which form part of this specification.

This invention is a novel improvement in methods of and apparatus for use in the study of metabolism; and is especially adapted for measuring the consumption of oxygen by human beings.

Two fundamental methods of gaseous metabolism measurements are possible for general laboratory usage; (a) the determination of the oxygen absorbed out of a closed, circulating volume of oxygen-rich air, and (b) the separation of the inspired and expired air, collection of the expired air, and analysis of samples of this air. Apparatus for performing the first method usually costs several hundred dollars, and the apparatus employed in the second method is fully as expensive as the closed-circuit apparatus. But the great drawback from the pedagogical standpoint is the length of time required in the gas analysis method to clean and assemble apparatus, provide the reagents, test, and make a good gas analysis.

The uses of the measurements of gaseous metabolism are twofold: First, they impart a knowledge of the composition of the outdoor air and the expired air, the volume of respiration per unit of time, the calculation of the amount of oxygen consumed and carbon dioxide produced per unit of time, and the relation between the volumes of carbon dioxide, and oxygen, i. e., the respiratory quotient, which is of great significance as an index of the character of the material being burned in the body. Second, the possibility of computing therefrom the total metabolism. Pedagogically, all the factors above mentioned are of great significance, but practically in clinical use only one is of great importance, i. e., the oxygen consumption, for from this is computed the heat production which under known conditions, such as complete muscular repose and in the post-absorptive state, is characterized as the "basal metabolism." Knowledge of the basal metabolism is of the greatest practical value not only in the study of the disturbances of the ductless glands but also as an index of general tone.

One object of the present invention is to provide a simple, portable, accurate and inexpensive apparatus for the measurement of the oxygen consumption alone; which apparatus can be readily carried around, and by which the amount of oxygen consumed from a definite volume of oxygen-rich air can be determined without any sacrifice of accuracy in results to facility of operation; the apparatus being operated by our novel method of measuring oxygen consumption by the use of such apparatus, as hereinafter explained.

The apparatus in brief comprises a reagent container with an elastic, readily expansible cap, valved tubes connecting the container with a mouthpiece; and a pump to supply quantitatively oxygen or air to the container. In use the subject inhales air through the mouthpiece from the container and exhales air through the mouthpiece back into the container, and the exhaled air passing through soda-lime in the bottom of the container is deprived of its carbon dioxide and can then be rebreathed. The elastic rubber cap permits large changes in volume with each respiration, as well as a gradual decrease in volume due to the absorption of oxygen in the lungs of the subject. The amount of decrease in volume in a unit of time is the measure desired.

If at the start there is only ordinary air in the container the absorption of oxygen would be so rapid that a normal adult subject would, in a few minutes, reduce the oxygen percentage to a point where the subject would actually exhibit signs of "oxygen want." It has been found that there is no measurable difference in oxygen consumption, whether the subject is breathing ordinary air, or air enriched with from 80 to 90 per cent of oxygen. Therefore the air in the container is preferably enriched with pure oxygen, before using the apparatus and the amount of oxygen absorbed out of the confined volume of oxygen-enriched air can be readily determined by introducing into the container a measured amount of ordinary room air.

To enable others to clearly understand and use the invention, we will describe the apparatus and method with reference to the accompanying drawings, which illustrate a practical, simple, portable apparatus by which the total volume of oxygen absorbed during a certain period can be readily determined and in the claims following such description we have set forth the essentials of the invention and the novel features of construction and novel combinations of parts for which protection is desired.

In the drawings:

Figure 1 is a side elevation, partly in section, of a complete apparatus embodying the invention.

Figure 2 is an enlarged detail sectional view of the three-way valve.

Fig. 3 is an enlarged detail sectional view of the mouth piece.

Fig. 4 is a detail sectional view of the pump piston.

The apparatus shown comprises a simple can or container 1 having an elastic cap 2, preferably made of thin sheet rubber which will readily expand or contract under slight variations of pressure and will act as a yielding variator of the volumetric capacity of the container. In the container is placed a quantity of a suitable reagent such as soda-lime indicated at R.

The upper part of the container, above the reagent, is connected by an inhaling tube 3 with a tube 4 to which is connected a mouth piece 9. Said tube 4 is also connected by an exhaling tube 5 with the lower end of the container 1, below the reagent therein. The tubes 3 and 5 may be of rubber.

A valve $3a$ is interposed between the tube 3 and the container 1 to permit air from the container to be inhaled through the tube 3, and prevent exhaled air passing back through tube 3 into the container. A valve $5a$ is also interposed between the tube 5 and the container to permit exhaled air to enter into the container 1, and prevent air being withdrawn from the container through tube 5.

Atmospheric air may be admitted into the container 1 through an inlet pipe 6 connected to a 3-way valve $6a$. This valve $6a$ is also connected by a tube $7a$, preferably of rubber, with an air pump 7, by which a measured quantity of air can be forced through valve $6a$ (when properly adjusted) and pipe 6 into the container 1.

The valve $6a$ is also connected by a pipe $8a$ with a calcium chloride tube 8 of ordinary construction as indicated in Fig. 1. By properly adjusting valve $6a$ dry room air can be first drawn through pipes $8a$ and $7a$ into the pump 7; and then, after properly shifting valve $6a$, such air can be forced from the pump into the container.

To the pipe $8a$ is attached a rod $8c$ which carries a clamp $8d$ through which extends an adjustable indicator rod or needle $2e$ arranged directly above the cap 2, and which serves as an indicator or index to show the degree of distension of the cap 2, as hereinafter explained.

The aforesaid parts are preferably constructed as follows:

The reagent container 1 may be an open top can of copper, galvanized iron or tin. The cap 2 may be of elastic gum or rubber. In practice, an ordinary pure-gum bathing cap makes a simple and entirely satisfactory cap or expansion chamber. Such caps have an opening which can be readily stretched over the top end of the container and it can be held firmly in place by an ordinary rubber band $2a$, and make an absolutely gas tight joint between the cap 2 and the upper portion of the container. Care must be taken to prevent any leak at such point.

To aid in noting the exact height or point of distension of the cap 2 a light-weight disk $2c$, of any suitable material, is cemented or otherwise attached to the top center of the cap; and said disk is adapted to contact with the lower end of the adjustable rod or needle $2e$.

As shown there are four openings in the wall of the container. In two are secured standard brass bushings, $1_a$, $1_b$ to which are respectively connected the casings $3_h$ $5_h$ of the valves $3a$, $5a$. To stiffen the connection a nut $1n$ is screwed onto the threaded portion of the bushing $1a$ inside the container, and a washer $1_o$ curved to fit the container is interposed between the nut and the inner wall of the container.

To the lower bushing $1b$ within the container is screwed a tube $5b$ having a slot in its lower side extending about one-half of its length.

In a third opening, above the level of the reagent R, is secured a standard brass bushing $1c$ to which the pipe 6 is attached. And to the fourth opening is connected a petcock 11 through which oxygen can be admitted to enrich the air in the container when desired.

The 3-way valve $6a$ is of standard size, and so constructed that the plug $6b$ can move a quarter turn. The central outlet of the valve (see Fig. 2) connects with the pipe 6;

the upper outlet connects with the pipe 8a; and the lower outlet connects with the tube 7a. A handle 6c is attached to the plug 6b of the valve in such a way that when the handle is upright as in Fig. 1 (and as indicated in dotted lines 6cx in Fig. 2) the calcium-chloride tube 8 will be connected to the air pump 7. When the handle is in a horizontal position (as indicated in dotted lines 6cx in Fig. 2) connection will be established between the pump and the interior of the container.

While any well-functioning respiratory valves may be used at 3a and 5a we prefer to use so-called "flutter valves," or "Sadd valves," such as were successfully used on war gas masks. On a gas mask no special housing for the valve is necessary, but in our apparatus the Sadd valves are enclosed in simple housings, preferably of brass, indicated at $3_h$ and $5_h$. The exact type of respiratory valve employed is not an essential of the invention; nor is the form of the housing thereof.

The tubes 3 and 5 are preferably of rubber, so they can be readily connected to the valves and the tube 4.

The tube 4 has at its upper end a portion 4c extending at right angles to the longitudinal axis thereof and to this end is connected one end of the tube 3. Below the portion 4c is a portion 4d extending parallel with 4c, to which is connected one end of the tube 5. Tube 4, and portions 4c and 4d thereof are preferably constructed of suitable lengths of thin brass tubing soldered together at the joints. To the lower open end of the tube 4 is connected a suitable mouth piece through which the patient breathes during the operation of the apparatus. In the tube 4 may be inserted a moistening device of any suitable kind. We preferably use a small loosely fitting cylinder of brass gauze covered with cotton or linen fabric which is thoroughly drenched with water before using the apparatus.

The tube 4 and mouth piece may be conveniently suspended from a rod or pipe $10_b$ attached by a swingable joint $10_c$, of any suitable construction, to an upright rod or pipe 10 which may be detachably attached in any suitable manner to the base B on which the entire apparatus can be mounted, as indicated in Fig. 1. The upright 10 can be unscrewed from the base when it is desired to transport the apparatus. When in use the member $10_b$ can be swung to right or left, and the tube 4 can be suspended from the rod 8b in any convenient manner. In the drawings the tube 4 is shown as provided with a ring 4e slidably mounted on rod $10_b$.

The "Denayrouse" mouth piece can be used, but as it is rather difficult to obtain, the novel simple mouth piece shown in the drawings can be used and it is constructed as follows:

A short thin walled tube 9a, preferably of brass, and having a flange or ring 9b on one end is slipped through an opening in a rubber shield 9. The tube 9 and ring 9b should be nickel plated, or otherwise treated to prevent corrosion. The shield 9 is preferably cut from a piece of heavy sheet rubber, in an oval form and has a hole in its center slightly smaller in diameter than the tube 9, to make a close joint therewith. The rubber shield 9 is of such size that it can be conveniently held in the mouth between the lips and the teeth. A short length of soft rubber tubing 9c connects the part 9 of the mouth piece with the lower end of tube 4. The combination of nickel-plated tube 9a and rubber shield 9 has the advantage of being easily cleaned and the expense of deterioration of a specially moulded mouth piece is done away with. The particular kind of mouth piece used however is of secondary importance.

To measure exactly the amount of air introduced to replace the oxygen used by the subject requires a calibrated instrument delivering known volumes of air. As no particular pressure is required a well made piston pump 7, such as an automobile pump, can be used; one having a reasonably large barrel and a short stroke of piston is of practical advantage. We have found an automobile grease gun makes a very satisfactory pump.

Preferably the piston of the pump (see Figs. 1 and 4) is composed of oppositely disposed leather cup washers 7a separated by an interposed metal disk 7b, and supported by exterior metal disks 7c the whole being tightly secured together and to the piston rods 7e by a nut 7d.

It is of vital importance that the piston be well lubricated, and closely fit the barrel at all times, so that there will be no opportunity for air to leak around or through the piston rod. A most excellent lubricator is mutton tallow. An invariable length of stroke of the piston is necessary, and a simple method of insuring this is to place a short metal collar 7h, on the piston rod inside of the cylinder and a like collar 7i on the piston rod outside of the cylinder. Then when the pump handle is drawn out the collar 7h on the inside comes in contact with the head of the cylinder so that the soft leather of the piston is not touched; and when the piston is pushed inward the collar 7i strikes the cylinder head before any part of the piston touches the other head of the cylinder. The length of stroke is regulated by such collars; and by changing the length of the collars 7h, 7i the length of stroke can be varied.

The exact amount of air discharged for each full reciprocation of the pump piston must be actually determined before the apparatus is actually used; and when so determined the exact amount of air forced into the container by the pump during use of the apparatus can be readily determined and controlled.

When the apparatus is to be used, the container should be filled to about the line of bushing 1a with a suitable reagent or carbon dioxide absorbent, such as a good grade of soda-lime which remains efficient until impacted. Occasionally the elastic cap 2 should be taken off the container, removed from the support, and the loose soda-lime poured out, and the impacted soda-lime removed.

Although there is no measurable pressure in any part of the entire respiration apparatus, the container and all connections must be absolutely air tight. When the apparatus is set up entirely ready for use, a rubber stopper should be placed in the mouth piece and the rubber cap distended to a moderately rounded form, and the index needle 2e adjusted until its lower end just touches the disk 2c. The degree of convexity of the cap is a rather important point in respiration experiments. As the cap is filled with air there is obviously a vertical as well as a lateral displacement of the cap, but when the cap is nearly filled, there will be a point where each millimeter in vertical displacement will correspond to about 5 to 10 cubic centimeters of air in the pump. That is, a movement of the piston of 3 to 5 millimeters will produce an elevation of about 1 millimeter of the disk 2e. This is the ideal point for beginning and ending respiration tests. After setting the cap a weight of 35 to 50 grams should be placed on top of the cap and allowed to stand for three minutes. If any appreciable leak is present, it will be indicated when the weight is removed, and the position of the index needle and the disk noted. If a leak is noted, it may be either in the valves or around the container and cap.

The valves can be tested while still attached to the rubber tubes by placing stoppers in the open end of each valve housing, immersing them in a pail of water, and blowing through the mouthpiece. The reagent container and cap can be tested alone by putting rubber stoppers in the pipes connecting with the container. By turning the 3-way valve the entire system may be tested at one and the same time, and if the apparatus shows no leak it is ready for use.

The usual prerequisites for the conditions of basal metabolism measurements are that the patient has had a preliminary period of rest, that there is absence of psychical activity or any febrile temperature; and particularly that the patient is in the post-absorptive condition. All these being assured, the operation would proceed as follows:

After placing a suitable moistener in the tube 4 the mouth piece is attached thereto. The container is then supplied with oxygen from a suitable container through the petcock 11, beginning admission of oxygen while the cap 2 is flat or slightly depressed into the container. This insures enough oxygen enrichment to preclude any possibility of "oxygen want."

A suitable nose clip is then placed on the patient's nose, preferably at the end of a normal expiration. When the operator does this it is helpful to watch the rise and fall of the chest of the patient. Any nose clip may be used but we prefer the Siebe-Gorman nose clip.

The cap 2 will now rise and fall with each respiration of the patient. Enough air should then be introduced into the container by the air pump to cause the cap 2 to expand until the disk 2c touches the needle 2e, and preferably until the cap bulges slightly around the top of the container. Great excess is undesirable, as it is liable to produce pressure against which the subject must exhale.

At the end of each successive expiration the disk 2c will press less and less against the needle 2e and shortly it will just touch. At this point a stopwatch should be started; or the exact time noted on an ordinary watch, recording first the position of the second hand, then the minute and hour.

In using the air pump the pump piston should first be pushed fully inward; then valve 6a should be turned so as to connect the pump 7 with the calcium-chloride tube 8, and then the pump piston drawn completely out. The valve 6a should then be turned to connect the pump 7 with the container and then the pump piston slowly pushed in forcing the perfectly dry air from the pump into the container.

The air pump 7 should then be again filled with dry air (as described) and slowly forced into the container. Any major movements of the plunger should be made when the cap is high, i. e., towards the end of expiration, to avoid introducing an excessive amount of air into the bag.

As the piston nears the end of a complete expelling stroke (forcing air out of the pump) the excess of air in the container slightly distends the cap; then wait, as at the start (see above), until the disk 2c just contacts the needle. Note the time but do not stop the watch. Record the time required for the introduction of air in one complete expelling stroke of the piston, in minutes and seconds.

Repeat the above operation for six full expelling strokes of the piston, noting the total elapsed time in each case.

At the end of the sixth expelling stroke, after noting the time, remove the nose clip and mouth piece; record the temperature of the pump and the barometric pressure: The temperature of the pump can be obtained by an ordinary laboratory thermometer, with its bulb touching the brass of the barrel.

The apparent volume of oxygen absorbed during the complete period when six full expelling strokes of the pump piston were introduced is computed readily. From the internal diameter of the barrel and the length and number of expelling strokes the apparent volume of air introduced is computed; and obviously the volume of air introduced would be constant for any given air pump. There is no tension of aqueous vapor to be considered, for the air drawn into the pump is dried by calcium chloride, in the tube 8 and thus the apparent volume may be reduced to 0° C. and 760 mm. by the formula—

$$V \times \frac{273}{273+t} \times \frac{p}{760}$$

in which $t$ is the temperature of the pump barrel and $p$ the observed barometric pressure. The gases increase in volume 1/273 for each degree rise in temperature, and the volume increases with decreasing barometric pressure. Carpenter's standard tables giving the combined factor for reducing volumes of dry air to 0° C. and 760 mm. may be used in calculating results.

Finally, if the reduced volume be divided by the time in minutes, the oxygen consumption per minute is obtained. The calculation thus is more simply expressed as $$V = \frac{K \times m}{T}$$

in which K is the constant apparent volume of six full pump strokes, $m$ is the reduction factor and T the time in minutes. While six full pump strokes are commonly used, obviously K may be altered to include any number of strokes.

While the final time, (i. e., the time required to make the six full expelling strokes,) may be taken as the measure of the metabolism and the oxygen computed directly therefrom; it is obvious that this time is computed from but two readings, i. e., that at the beginning and that at the end of the experiment. The error in reading is normally very slight.

Rarely should the disk $2_c$ be farther than 1 millimeter from the index needle at the time of reading, i. e., a difference representing hardly 10 c. c. Almost invariably it will be very much less than that. But there may be an abnormally shallow or abnormally deep respiration just at the beginning or end. Such respirations would effect the calculations of the entire experiment. Before computing the results, therefore, it is best to inspect the actual times required for the absorption of each expelling piston stroke, and they should be reasonably regular and approximate multiples of the time required for the first full expelling piston stroke.

The measurement of the oxygen consumption per minute, as outlined above, is of value chiefly as furnishing the means for the direct computation of the heat production. Each liter of oxygen absorbed in metabolic transformations is accompanied by the liberation of approximately 5 calories of heat. The exact calorific value of a liter of oxygen varies from 4.686 to 5.047, varying directly as the respiratory quotient. The respiratory quotient of .70 has the lower value and 1.00 the higher value. Assuming, however, an average respiratory quotient of .82 in the post-absorptive condition, with a calorific equivalent per liter of oxygen of 4.825 calories, the heat production from the oxygen per minute is readily obtained.

Having thus described our invention we claim:

1. In an apparatus of the character specified, a reagent container having a substantially non-resistant expansive portion; a mouth piece; an inhaling tube connecting the container with the mouthpiece; an exhaling tube connecting the mouth piece with the container; means to prevent inhalation through the exhaling tube, and exhaling through the inhalation tube; means for admitting a measured volume of dry air into the container; and means coacting with said expansive portion to indicate variations in the volume of air in the container.

2. In an apparatus of the character specified, a reagent container having a substantially non-resistant expansive portion; a mouth piece; an inhaling tube connecting the upper portion of the container with the mouth piece; an exhaling tube connecting the mouth piece with the container; means to prevent inhalation through the exhaling tube, and exhaling through the inhalation tube; an air measuring pump; means for controlling the admission of air from the pump to the container; means to desiccate the air supplied to the pump; and means coacting with said expansive portion to indicate variation in the volume of air in the container.

3. In an apparatus of the character specified, a reagent container having a substantially non-resistant expansive portion; a mouth piece; an inhaling tube connecting the upper portion of the container above the reagent with the mouth piece; an exhaling tube connecting the mouth piece with the container below the reagent therein;

valves to prevent inhalation through the exhaling tube, and exhaling through the inhalation tube; means for admitting oxygen to the container; means for supplying a measured volume of dry air into the container; means for controlling the admission of dry air from the supply to the container; and means coacting with said expansive portion to indicate variations in the volume of oxygenated air in the container.

4. In an apparatus of the character specified, a reagent container having a substantially non-resistant expansive portion; a mouth piece; an inhaling tube connecting the container with the mouth piece; an exhaling tube connecting the mouth piece with the container; valves to prevent inhalation through the exhaling tube, and exhaling through the inhalation tube; means for admitting excess oxygen to the container; an air measuring pump; a tube for conducting air from said pump into the container; a valve for controlling the admission of air from the pump to the container; means to desiccate the air supplied to the pump; and means coacting with said expansive portion to indicate variation in the volume of air in the container.

5. In an apparatus of the character specified, a reagent container having an elastic expansive cap; a mouth piece; an inhaling tube connecting the container with the mouth piece; an exhaling tube connecting the mouthpiece with the container; means to prevent inhalation through the exhaling tube, and exhaling through the inhalation tube; means for supplying a measured volume of dry air into the container; means for controlling the admission of dry air from the supply to the container; and means coacting with said expansive cap to indicate variations in the volume of air in the container.

6. In an apparatus of the character specified, a reagent container having an elastic expansive cap; a mouth piece; an inhaling tube connecting the container with the mouth piece; an exhaling tube connecting the mouth piece with the container; valves to prevent inhalation through the exhaling tube, and exhaling through the inhalation tube; an air measuring pump; a tube for conducting air from said pump into the container above the reagent therein; a valve for controlling the admission of air from the pump to the container; means to desiccate the air supplied to the pump; and means coacting with said cap to indicate variation in the volume of air in the container.

7. Apparatus of the character specified comprising a reagent container having a non-resistant elastic cap; a mouth piece tube; an exhaling tube; an inhaling tube connecting the mouth piece tube with the container; valves to prevent inhalation through the exhaling tube, and exhaling through the inhalation tube; a pump, means for admitting a measured volume of dry air from the pump into the container; a valve for controlling the admission of air to the pump, and from the pump to the container; means for admitting excess oxygen into the container; and an adjustable indicator coacting with said cap to indicate variations in the volume of air in the container.

8. Apparatus of the character specified comprising a reagent container having a non-resistant elastic cap; a mouth piece tube; an inhaling tube connecting the upper portion of the container above the reagent with the mouth piece tube; an exhaling tube connecting the mouth piece tube with the container below the reagent therein; valves to prevent inhalation through the exhaling tube, and exhaling through the inhalation tube; a chlorinator; an air measuring pump; a tube for conducting air from said pump into the container above the reagent therein; a valve for controlling the admission of air from the chlorinator to pump and from the pump to the container; means for admitting excess oxygen to the container; and an adjustable indicator coacting with said cap to indicate variation in the volume of air in the container.

In testimony that we claim the foregoing as our own, we affix our signatures.

FRANCIS G. BENEDICT.
CORNELIA GOLAY BENEDICT.